United States Patent
Hosono et al.

(10) Patent No.: US 12,448,032 B2
(45) Date of Patent: Oct. 21, 2025

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Hiroshi Hosono, Toyota (JP); Terutaka Tamaizumi, Okazaki (JP); Yuki Inden, Okazaki (JP); Saki Takahashi, Seto (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 18/671,134

(22) Filed: May 22, 2024

(65) Prior Publication Data
US 2024/0400130 A1 Dec. 5, 2024

(30) Foreign Application Priority Data
May 31, 2023 (JP) .................... 2023-089705

(51) Int. Cl.
*B62D 5/04* (2006.01)
*B62D 5/00* (2006.01)
(52) U.S. Cl.
CPC ........... *B62D 5/0463* (2013.01); *B62D 5/006* (2013.01)
(58) Field of Classification Search
CPC ...... B62D 5/0463; B62D 5/005; B62D 5/006; B62D 5/046
See application file for complete search history.

(56) References Cited

U.S. PATENT DOCUMENTS

| | | | | |
|---|---|---|---|---|
| 2018/0118253 | A1* | 5/2018 | Minamiguchi | ...... B62D 5/0472 |
| 2019/0337556 | A1* | 11/2019 | Tsubaki | ................. B62D 6/007 |
| 2020/0062294 | A1* | 2/2020 | Kodera | ................. B62D 5/008 |

FOREIGN PATENT DOCUMENTS

| | | |
|---|---|---|
| EP | 3 219 580 A1 | 9/2017 |
| JP | 2017-144887 A | 8/2017 |

OTHER PUBLICATIONS

Oct. 21, 2024 Extended Search Report issued in European Patent Application No. 24178850.4.

* cited by examiner

*Primary Examiner* — Jacob M Amick
(74) *Attorney, Agent, or Firm* — Oliff PLC

(57) ABSTRACT

A processor is configured to execute reaction force setting processing, reaction force application processing, axial force gradient calculation processing, and interlock processing. The reaction force setting processing is processing of setting steering reaction force using phase compensation processing. The reaction force application processing is processing of operating a reaction force motor with reaction force set by the reaction force setting processing as input. The axial force gradient calculation processing is processing for calculating an axial force gradient as a variable indicating the ratio of the change in resisting force against rotation of the steering shaft to the change in rotation angle of the steering shaft. The interlocking processing is processing of changing one of both the value of a phase compensation regulation variable as a variable for regulating a manner of the phase compensation and the axial force gradient according to the other.

6 Claims, 6 Drawing Sheets

STEERING CONTROL DEVICE

CROSS-REFERENCE TO RELATED APPLICATION

This application claims priority to Japanese Patent Application No. 2023-089705 filed on May 31, 2023, incorporated herein by reference in its entirety.

BACKGROUND

1. Technical Field

The present disclosure relates to a steering control device.

2. Description of Related Art

For example, Japanese Unexamined Patent Application Publication No. 2017-144887 described below describes a control device for controlling an electric power steering device as a control target. This control device sets the torque of a motor for generating assist force by using phase compensation processing. This setting is aimed at stabilizing the system.

SUMMARY

The inventor has studied control of a steering system in a state where power transmission between a steering shaft and turning wheels is cut off. In that case, the degree of freedom in adjusting the characteristics of the steering system by control is high. However, when the characteristics of the steering system are arbitrarily set, there is a risk that an effect of stabilization by phase compensation processing may be impaired.

A steering control device according to a first aspect of the present disclosure is configured to control, as an object of control, a steering system including a reaction force motor that applies steering reaction force to a steering shaft and a turning motor that turns turning wheels in a state where power transmission from the steering shaft is cut off. The steering control device includes a processor. The processor is configured to execute reaction force setting processing, reaction force application processing, axial force gradient calculation processing, and interlocking processing. The reaction force setting processing is processing of setting the steering reaction force by using phase compensation processing. The reaction force application processing is processing of operating the reaction force motor with the reaction force set by the reaction force setting processing being used as input. The phase compensation process is processing of performing phase-compensation on the steering reaction force. The axial force gradient calculation processing is processing of calculating an axial force gradient. The axial force gradient is a variable indicating a ratio of the change in resisting force against rotation of the steering shaft to the change in a rotation angle of the steering shaft. The interlocking processing is processing of changing one of the value of a phase compensation regulation variable and the axial force gradient according to the other of the phase compensation regulation variable and the axial force gradient. The phase compensation regulation variable is a variable for regulating a manner of the phase compensation.

The magnitude of the axial force gradient at which the phase compensation processing effectively functions changes according to the settings such as the time constant of the phase compensation processing. Therefore, in the above configuration, one of both the variable for regulating the manner of phase compensation and the axial force gradient is changed according to the other. This makes it possible to implement phase compensation processing suitable for the magnitude of the axial force gradient.

In the steering control device according to a first aspect of the present disclosure, the reaction force setting processing may include assist amount setting processing, and axial force setting processing. The axial force setting processing may be processing of setting axial force which is a resisting force against a rotational operation of the steering shaft by a driver. The assist amount setting processing may be processing that includes the phase compensation processing and sets an assist amount. The assist amount may be an amount that assists the driver in rotating the steering shaft. The steering reaction force may be an amount that is determined according to a value obtained by subtracting the assist amount from the axial force. The axial force gradient calculation processing may be processing of calculating an amount of change in the axial force set by the axial force setting processing with respect to a change in the rotation angle of the steering shaft.

In a steering system in which power is transmitted between a steering shaft and turning wheels, the axial force from the turning wheels acts as a force for impeding rotating the steering shaft by the driver. Therefore, the assist amount is an amount for assisting the driver's steering. On the other hand, in the above configuration, in a state where power transmission between the steering shaft and the turning wheels is cut off, an axial force that virtually resists the rotational operation of the steering shaft can be implemented through control. Therefore, the assist amount can be set based on the same concept as the steering system in which power is transmitted between the steering shaft and the turning wheels.

In the steering control device according to the first aspect of the present disclosure, the interlocking processing may be processing of changing the value of the phase compensation regulation variable with the axial force gradient being used as input. In the above configuration, the manner of phase compensation by the phase compensation processing is changed according to the axial force gradient. Therefore, appropriate phase compensation can be achieved according to the axial force gradient.

In the steering control device according to the first aspect of the present disclosure, the assist amount setting processing may be processing of setting the assist amount according to a detection value of steering torque input to the steering shaft. The phase compensation processing may include phase lag compensation processing. The phase lag compensation processing may be processing of delaying the phase of the detection value and inputting the delayed phase to the assist amount setting processing. The phase compensation regulation variable may include a lag regulation variable. The lag regulation variable may be a variable that prescribes the phase lag compensation processing. The interlocking processing may include processing of changing the value of the lag regulation variable with the axial force gradient being used as input.

In the above configuration, the manner of phase compensation by the phase lag compensation processing is changed according to the axial force gradient. Therefore, appropriate phase lag compensation can be implemented according to the axial force gradient.

In the steering control device according to the first aspect of the present disclosure, the assist amount setting processing may include basic assist amount setting processing. The basic assist amount setting processing may be processing of setting a basic assist amount according to a detection value of steering torque input to the steering shaft. The phase compensation processing may include phase advance compensation processing. The phase advance compensation processing may be processing of calculating an advance correction amount of the basic assist amount with the detection value being used as input. The assist amount setting processing may be processing of setting the assist amount according to a value obtained by correcting the basic assist amount with the advance correction amount. The phase compensation regulation variable may include an advance regulation variable. The advance regulation variable may be a variable that prescribes the phase advance compensation processing. The interlocking processing may include processing of changing the value of the advance regulation variable with the axial force gradient being used as input.

In the above configuration, the manner of phase compensation by the phase advance compensation processing is changed according to the axial force gradient. Therefore, appropriate phase advance compensation can be implemented according to the axial force gradient.

In the steering control device according to the first aspect of the present disclosure, the axial force setting processing may include processing of setting the axial force according to the value of the axial force regulation variable. The axial force regulation variable may be a variable for regulating a relation of the axial force with a value of an angle variable of the steering system. The interlocking processing may include processing of changing the value of the axial force regulation variable with the value of the phase compensation regulation variable being used as input.

In the above configuration, since the value of the axial force regulation variable is changed according to the value of the phase compensation regulation variable, it is possible to set the axial force gradient within a range that is adaptable to the phase compensation processing.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

A first embodiment will be described below with reference to the drawings.

Prerequisite Configuration

Figure 1:
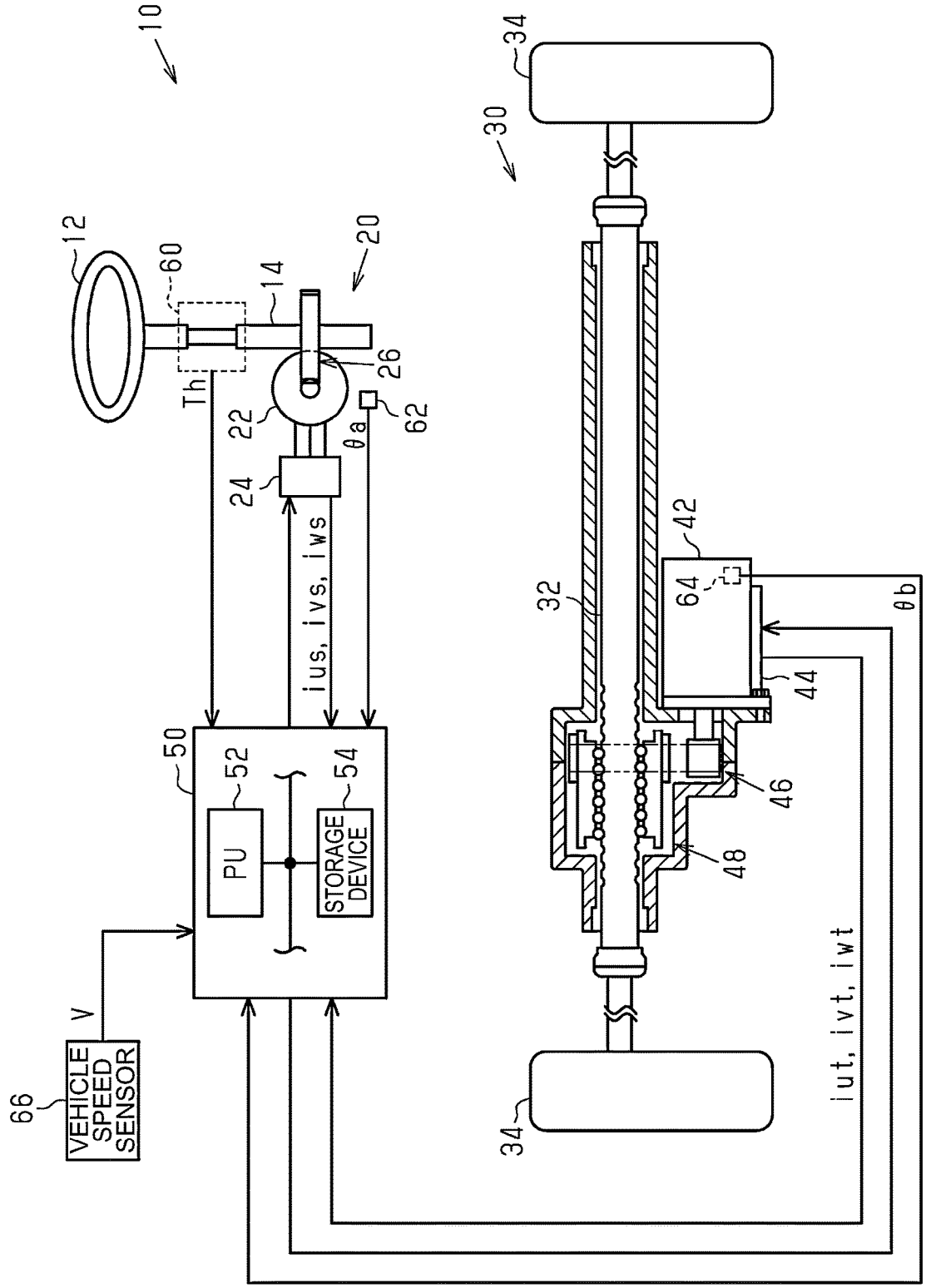
FIG. 1 is a diagram showing a configuration of a steering system according to a first embodiment.

A vehicle steering device 10 shown in FIG. 1 is a steer-by-wire type device. The steering device 10 includes a steering wheel 12, a steering shaft 14, a reaction force actuator 20, and a turning actuator 30. The steering shaft 14 is connected to the steering wheel 12. The reaction force actuator 20 is an actuator for applying a resisting force against a force with which the driver operates the steering wheel 12. The reaction force actuator 20 includes a reaction force motor 22, a reaction force inverter 24, and a reaction force deceleration mechanism 26. The reaction force motor 22 applies a steering reaction force, which is a resisting force against steering, to the steering wheel 12 via the steering shaft 14. The reaction force motor 22 is connected to the steering shaft 14 via the reaction force deceleration mechanism 26. For example, a three-phase synchronous motor is used as the reaction force motor 22. The reaction force deceleration mechanism 26 consists of, for example, a worm and wheel.

The turning actuator 30 is an actuator which is used to turn the turning wheels 34 according to a driver's steering intention indicated by the operation of the steering wheel 12 by the driver. The turning actuator 30 includes a rack shaft 32, a turning motor 42, a turning inverter 44, a turning transmission mechanism 46, and a conversion mechanism 48. As an example, a three-phase surface magnet synchronous motor (SPM) is employed as the turning motor 42. The turning transmission mechanism 46 consists of a belt transmission mechanism. The rotational power of the turning motor 42 is transmitted to the conversion mechanism 48 by the turning transmission mechanism 46. The conversion mechanism 48 converts the transmitted rotational power into displacement power in the axial direction of the rack shaft 32. The displacement of the rack shaft 32 in the axial direction turns the turning wheels 34.

The steering control device 50 controls, as objects of control, the steering wheel 12 and the turning wheels 34. In other words, the steering control device 50 controls a steering reaction force against the driver's steering, which is a control amount of the steering wheel 12 as a control target. Further, the steering control device 50 controls the turning angle which is a control amount of the turning wheels 34 as a control target. The turning angle is a cutting angle of the tire as the turning wheels 34.

The steering control device 50 refers to a steering torque Th detected by a torque sensor 60 in order to control the control amount. The steering torque Th is a torque applied to the steering shaft 14 through the driver's operation on the steering wheel 12. The steering control device 50 refers to a rotation angle θa which is an angle of the rotation shaft of the reaction force motor 22 and detected by a steering-side rotation angle sensor 62 in order to control the control amount. Further, the steering control device 50 refers to currents ius, ivs, and iws flowing through the reaction force motor 22 in order to control the control amount. The currents ius, ivs, and iws may be currents to be detected, for example, as voltage drops across shunt resistors provided in respective legs of the reaction force inverter 24. The steering control device 50 refers to a rotation angle θb which is an angle of the rotation shaft of the turning motor 42 and detected by the turning-side rotation angle sensor 64 in order to control the control amount. Further, the steering control device 50 refers to currents iut, ivt, and iwt flowing through the turning motor 42 in order to control the control amount. The currents iut, ivt, and iwt may be currents to be detected, for example, as voltage drops across shunt resistors provided in respective legs of the turning inverter 44. The steering control device 50 refers to a vehicle speed V detected by a vehicle speed sensor 66.

The steering control device 50 includes PU 52 and a storage device 54. The PU 52 is a software processing device such as CPU, GPU, or TPU. The storage device 54 may be a non-volatile memory that cannot be electrically rewritten. Further, the storage device 54 may be a recording medium such as an electrically rewritable non-volatile memory, or a disk medium.

Overview of Control

Figure 2:
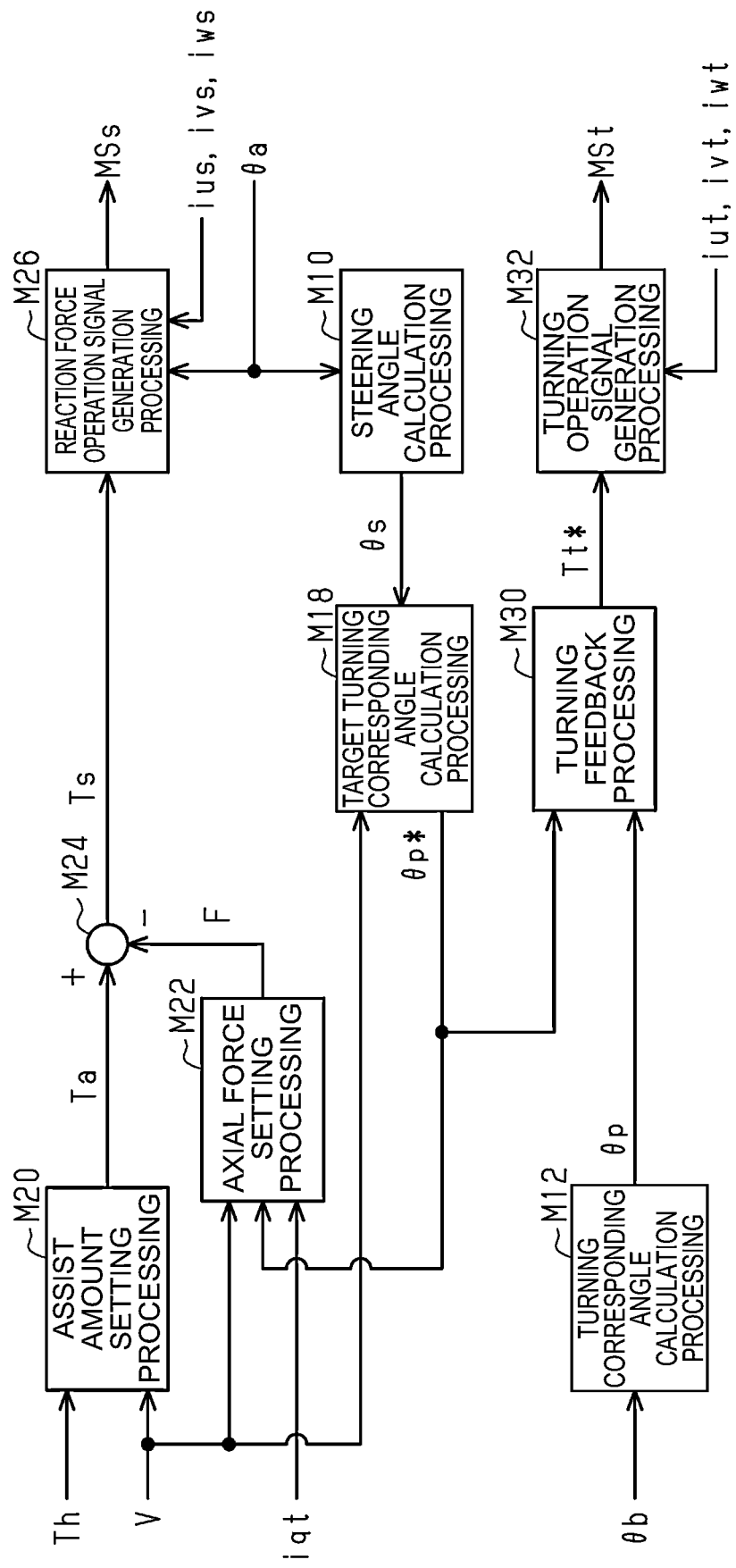
FIG. 2 is a block diagram showing processing to be executed by a control device according to the embodiment.

FIG. 2 shows processing to be executed by the steering control device 50. The processing shown in FIG. 2 is implemented by the PU 52 repeatedly executing a program stored in the storage device 54, for example, at a predetermined period.

Steering angle calculation processing M10 includes processing of converting the rotation angle θa into an integrated angle containing a range exceeding 360 degrees, for example, by counting the number of rotations of the reaction force motor 22 from a steering neutral position which is the position of the steering wheel 12 when a vehicle is traveling straight. The steering angle calculation processing M10 includes processing of calculating a steering angle θs by multiplying the converted integrated angle by a conversion coefficient based on a rotation speed ratio of the reaction force deceleration mechanism 26.

Turning corresponding angle calculation processing M12 includes processing of converting a rotation angle θb into an integrated angle containing a range exceeding 360 degrees, for example, by counting the number of rotations of the turning motor 42 from a rack neutral position which is a position of the rack shaft 32 when the vehicle is traveling straight. The turning corresponding angle calculation processing M12 includes processing of calculating a turning corresponding angle θp corresponding to the turning angle of the turning wheels 34 by multiplying the converted integrated angle by a conversion coefficient corresponding to the deceleration ratio of the turning transmission mechanism 46, the advance of the conversion mechanism 48, etc. The turning corresponding angle θp is an amount that is proportional to the turning angle. As an example, the turning corresponding angle θp is positive when it is an angle on the right side of the rack neutral position, and is negative when it is an angle on the left side of the rack neutral position.

Target turning corresponding angle calculation processing M18 is processing of calculating a target turning corresponding angle θp* according to the steering angle θs and the vehicle speed V.

Assist amount setting processing M20 is processing of calculating an assist amount Ta with the steering torque Th and the vehicle speed V being used as input. The assist amount Ta is an amount in the same direction as the driver's steering direction. The magnitude of the assist amount Ta is set to a large value when increasing the force for assisting the steering by the driver.

Axial force setting processing M22 is processing of calculating an axial force F acting on the rack shaft 32 through the turning wheels 34 with the vehicle speed V, the q-axis current iqt of the turning motor 42, and the target turning corresponding angle θp* being used as input. The axial force F is a value that expresses the force acting on the rack shaft 32 through the turning wheels 34 through control. However, it is not required that the axial force F is intended to estimate the force acting on the rack shaft 32 with high accuracy. The axial force F may be, for example, a virtually determined force acting on the rack shaft 32. The axial force F is converted into torque to be applied to the steering shaft 14. In other words, it is converted into torque to be applied to the steering shaft 14 when it is assumed that power transmission between the turning wheels 34 and the steering shaft 14 is possible. The axial force F is an amount acting in a direction opposite to the steering direction of the driver. The axial force setting processing M22 may be processing of calculating the axial force F such that the absolute value of the axial force F is larger as the absolute value of the target turning corresponding angle θp* is larger. Further, it may be processing of calculating the axial force F such that the absolute value of the axial force F increases as the vehicle speed V increases, for example. Still further, it may be processing of calculating the axial force F such that the absolute value of the axial force F is larger as the absolute value of the q-axis current iqt is larger. Here, the q-axis current iqt is calculated by the PU 52 according to the turning corresponding angle θp and the currents iut, ivt, iwt.

Subtraction processing M24 is processing in which a value obtained by subtracting the axial force F from the assist amount Ta is substituted into a target reaction force torque Ts. The target reaction force torque Ts is a target value of the torque to be applied to the steering shaft 14 by the reaction force motor 22.

Reaction force operation signal generation processing M26 is processing of generating an operation signal MSs for the reaction force inverter 24 in order to control the torque of the reaction force motor 22 such that the torque to be applied to the steering shaft 14 is equal to the target reaction force torque Ts. Specifically, the reaction force operation signal generation processing M26 includes processing of converting the target reaction force torque Ts into the target torque of the reaction force motor 22. Further, the reaction force operation signal generation processing M26 includes processing of calculating the operation signal MSs for the reaction force inverter 24 in order to make the current flowing through the reaction force motor 22 closer to a current determined from the target reaction force torque Ts by current feedback control. Note that the operation signal MSs is actually an operation signal for each of six switching elements of the reaction force inverter 24. Since the torque of the reaction force motor 22 is set to the target reaction force torque Ts, a steering reaction force which resists a force attempting to rotate the steering wheel 12 is equal to "(−1)·Ts".

Turning feedback processing M30 is processing in which an operation amount of feedback control using the turning corresponding angle θp as a control amount and the target turning corresponding angle θp* as a target value of the control amount is substituted into the target turning torque Tt*. The target turning torque Tt* has a constant ratio to the torque of the turning motor 42.

Turning operation signal generation processing M32 is processing of generating an operation signal MSt for the turning inverter 44 in order to control the torque of the turning motor 42 such that the torque of the turning motor 42 takes a value having a constant ratio with the target turning torque Tt*. Specifically, the turning operation signal generation processing M32 includes processing of converting the target turning torque Tt* into the target torque of the turning motor 42. Further, the turning operation signal generation processing M32 includes processing of calculating the operation signal MSt for the turning inverter 44 in order to make the current flowing through the turning motor 42 closer to a current determined from the target torque by current feedback control. Note that the operation signal MSt is actually an operation signal for each of the six switching elements of the turning inverter 44.

Axial Force Setting Processing

Figure 3:
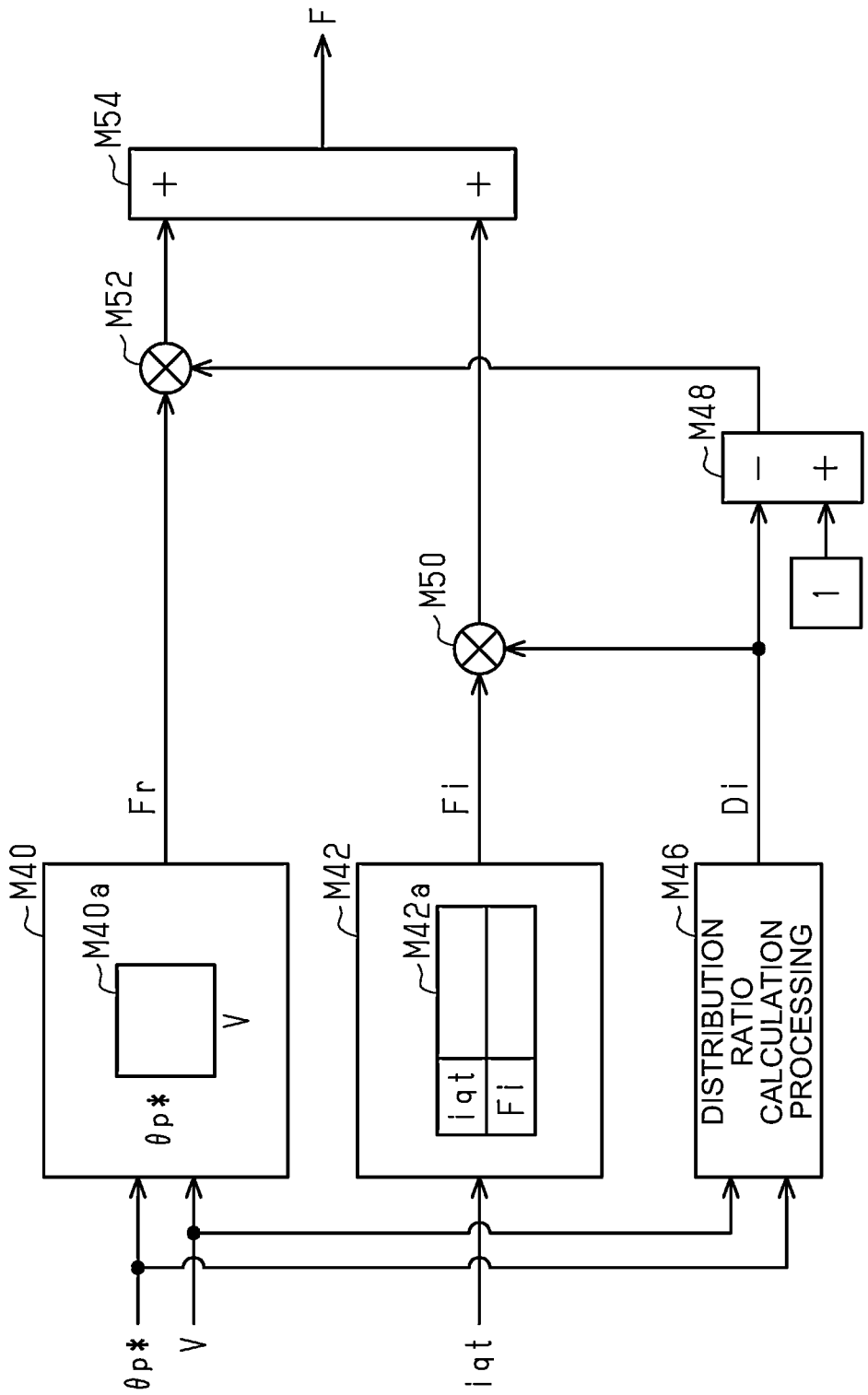
FIG. 3 is a block diagram showing processing to be executed by the control device according to the embodiment.

FIG. 3 shows details of the axial force setting processing M22.

Angular axial force setting processing M40 is processing of calculating an angular axial force Fr with the target turning corresponding angle θp* and the vehicle speed V being used as input. The angular axial force Fr is an estimated value of the axial force prescribed by an arbitrarily set vehicle model or the like. The angular axial force Fr is calculated as an axial force that does not reflect road surface information. The road surface information is information on minute irregularities that do not affect the behavior of a vehicle in a lateral direction, steps that affect the behavior of the vehicle in the lateral direction, etc. For example, the angular axial force setting processing M40 may be processing of performing calculation such that the absolute value of the angular axial force Fr is larger as the absolute value of the target turning corresponding angle θp* is larger. For example, the angular axial force setting processing M40 may be processing of performing calculation such that the absolute value of the angular axial force Fr is larger as the vehicle speed V increases.

Specifically, the angular axial force setting processing M40 is process for performing a map calculation on the angular axial force Fr with an angular axial force map M40a which is map data. The angular axial force map M40a is a map using the target turning corresponding angle θp* and the vehicle speed V as input variables and the angular axial force Fr as an output variable.

Here, the map data is set data of discrete values of an input variable and values of an output variable which correspond to the respective values of the input variable. Further, the map calculation may be processing in which when the value of the input variable coincides with any of the values of the input variable of the map data, the corresponding value of the output variable of the map data is used as a calculation result. Further, the map calculation may be processing in which when the value of the input variable does not coincide with any of the values of the input variable of the map data, a value obtained by interpolating a plurality of values of the output variable contained in the map data is used as a calculation result. In place of this processing, the map calculation may be processing in which when the value of the input variable does not coincide with any of the values of the input variable of the map data, a value of the output variable of the map data which corresponds to the closest value out of a plurality of values of the input variable contained in the map data is used as a calculation result.

Current axial force setting processing M42 is processing of calculating a current axial force Fi with the q-axis current iqt of the turning motor 42 being used as input. The current axial force Fi is an estimated value of the axial force that actually acts on the rack shaft 32 operating to turn the turning wheels 34, that is, the axial force that is actually transmitted to the rack shaft 32. The current axial force Fi is calculated as an axial force reflecting the above-described road surface information. For example, the current axial force setting processing M42 may be processing of calculating the current axial force Fi on the assumption that the torque to be applied to the rack shaft 32 by the turning motor 42 and the torque corresponding to the force to be applied to the rack shaft 32 through the turning wheels 34 are balanced with each other. In other words, the current axial force setting processing M42 is processing of calculating a larger value for the absolute value of the current axial force Fi as the absolute value of the q-axis current iqt is larger.

Specifically, the current axial force setting processing M42 is processing of performing map calculation on the current axial force Fi with a current axial force map M42a. The current axial force map M42a is a map using the q-axis current iqt as input variable and the current axial force Fi as an output variable.

Distribution ratio calculation processing M46 is processing of calculating a ratio Di with the vehicle speed V and the target turning corresponding angle θp*. The ratio Di is the ratio of the current axial force Fi to the sum of the angular axial force Fr and the current axial force Fi. The ratio Di has a value of zero or more and one or less. The distribution ratio calculation processing M46 may be, for example, processing in which the PU 52 performs the map calculation on the ratio Di in a state where map data is stored in the storage device 54. Here, the map data is data using the vehicle speed V and the target turning corresponding angle θp* as input variables and using the ratio Di as an output variable.

Second distribution ratio calculation processing M48 is processing of calculating a second ratio "1-Di" by subtracting the ratio Di from "1". The second ratio is the ratio of the angular axial force Fr to the sum of the angular axial force Fr and the current axial force Fi.

First ratio multiplication processing M50 is processing of multiplying the current axial force Fi by the ratio Di. Second ratio multiplication processing M52 is processing of multiplying the angular axial force Fr by the second ratio. Addition processing M54 is processing of substituting, into the axial force F, a value obtained by adding an output value of the first ratio multiplication processing M50 and an output value of the second ratio multiplication processing M52. In other words, the axial force F is a weight average processed value of the angular axial force Fr and the current axial force Fi.

Assist Amount Setting Processing

Figure 4:
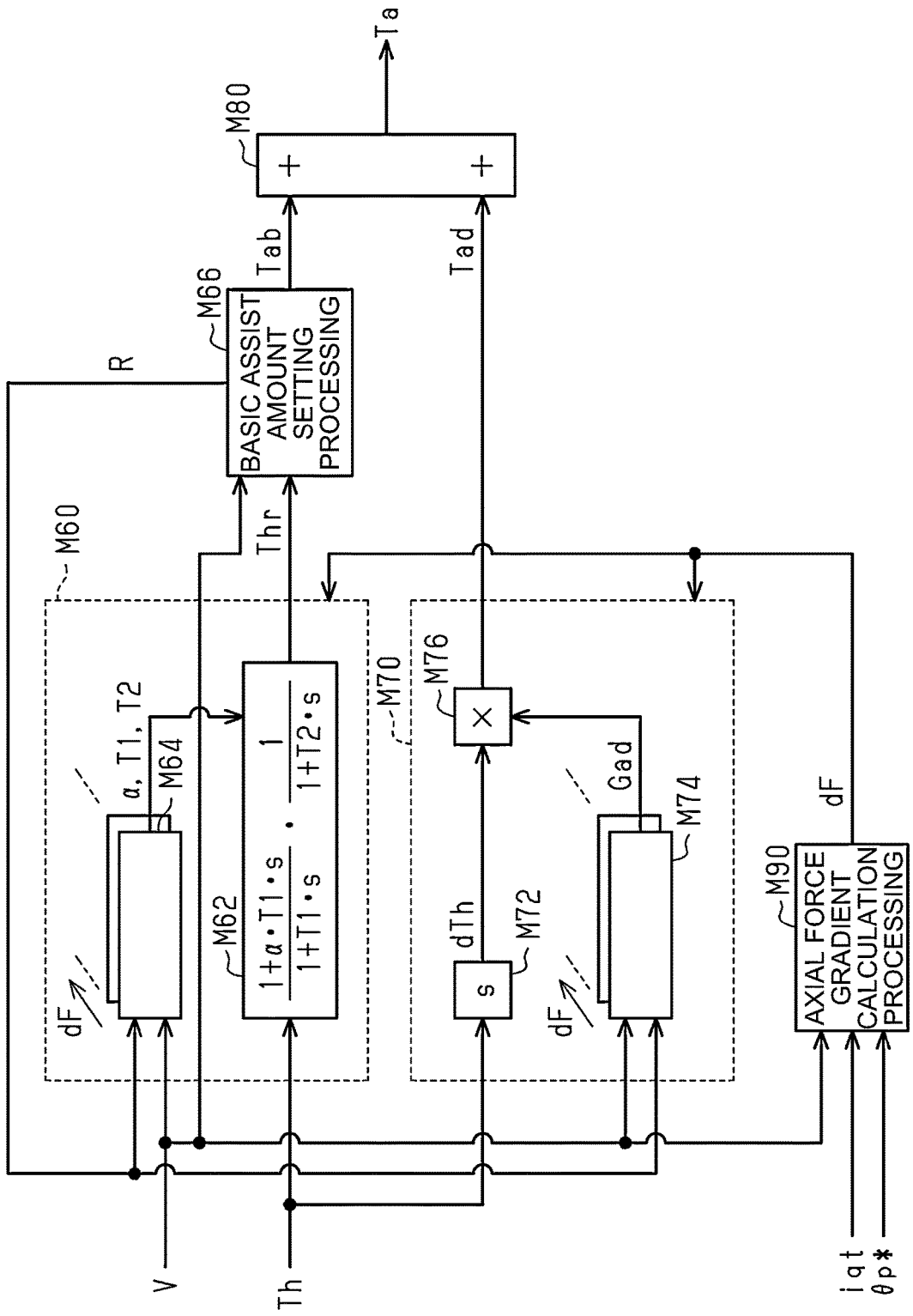
FIG. 4 is a block diagram showing processing to be executed by the control device according to the embodiment.

FIG. 4 shows details of the assist amount setting processing M20.

Phase lag compensation processing M60 is processing of delaying the phase of the steering torque Th. This may be processing which is intended to, for example, perform phase compensation on the steering torque Th in order to adjust the frequency characteristics of the phase difference on both sides of a torsion bar included in the torque sensor 60. The steering torque Th after phase compensation, which is the output value of the phase lag compensation processing M60, is the steering torque Thr. The phase lag compensation processing M60 includes filter processing M62 and filter coefficient setting processing M64.

Filter processing M62 includes a phase lag filter and a low pass filter. The transfer function of the phase lag filter is "$(1+\alpha \cdot T1 \cdot s)/(1+T1 \cdot s)$". The transfer function of the low-pass filter is "$1/(1+T2 \cdot s)$". The steering torque Thr is a value obtained by subjecting the steering torque Th to the processing using the phase lag filter and the low-pass filter.

Filter coefficient setting processing M64 sets filter coefficients α, T1 of the phase lag filter and a filter coefficient T2 of the low-pass filter. The filter coefficient setting processing M64 sets the filter coefficients α, T1, T2 according to the vehicle speed V, an assist gradient R described later, and an axial force gradient dF described later.

Basic assist amount setting processing M66 is processing of setting a basic assist amount Tab with the steering torque Thr and the vehicle speed V being used as input. The basic assist amount setting processing M66 sets the basic assist amount Tab to a value having a positive correlation with the steering torque Thr. This processing may be, for example, processing of performing map calculation on the basic assist amount Tab by the PU 52 in a state where map data is stored in advance in the storage device 54. The map data is data using the steering torque Thr and the vehicle speed V as input variables and the basic assist amount Tab as an output variable.

The basic assist amount setting processing M66 includes processing of calculating and outputting an assist gradient R. The assist gradient R indicates the ratio of the change in the basic assist amount Tab to the change in the steering torque Thr.

Phase advance compensation processing M70 is processing of advancing the phase of the assist amount Ta. This may be for the purpose of performing phase compensation on the assist amount Ta, for example, in order to adjust the response delay of the change in the steering wheel 12 to the change in the steering torque Th. The phase advance compensation processing M70 includes a differential calculation M72, gain setting processing M74, and multiplication processing M76.

The differential calculation M72 is processing of calculating a first-order time differential value dTh of the steering torque Th. The gain setting processing M74 is processing of setting a gain Gad with the assist gradient R, the vehicle speed V, and the axial force gradient dF being used as input. The gain setting processing M74 may be processing of performing the map calculation on the gain Gad in a state where map data is stored in advance in the storage device 54. This map data is data which use the assist gradient R, the vehicle speed V, and the axial force gradient dF as input variables, and the gain Gad as an output variable.

Multiplication processing M76 is processing of multiplying the time differential value dTh by the gain Gad. The product of the time differential value dTh and the gain Gad is an advance compensation amount Tad as the output of the phase advance compensation processing M70.

Composition processing M80 is processing of adding an advance compensation amount Tad to the basic assist amount Tab. The thus-calculated value is the assist amount Ta.

Axial force gradient calculation processing M90 is processing of calculating the axial force gradient dF with the vehicle speed V, the target turning corresponding angle $\theta p^*$, and the q-axis current iqt being used as input. The axial force gradient dF is a variable indicating the ratio of the change in the axial force F to the change in the steering angle $\theta s$. As shown in FIG. 3, the angular axial force Fr is calculated with the target turning corresponding angle $\theta p^*$ and the vehicle speed V being used as input. The target turning corresponding angle $\theta p^*$ is a variable having a correlation with the steering angle $\theta s$. Therefore, the ratio of the change in the angular axial force Fr to the change in the steering angle $\theta s$ can be calculated according to the target turning corresponding angle $\theta p^*$ and the vehicle speed V.

On the other hand, in the process illustrated in FIG. 3, the current axial force Fi is set independently of the variable indicating the angle. However, since the q-axis current iqt is implemented by the feedback control using the turning corresponding angle $\theta p$ as a control amount, etc., the change in the current axial force Fi has a relation with the change in the steering angle $\theta s$. Therefore, it is possible to grasp the ratio of the change in the current axial force Fi to the change in the steering angle $\theta s$ with the target turning corresponding angle $\theta p^*$ and the q-axis current iqt being used as input.

Specifically, the axial force gradient calculation processing M90 may be processing of performing map calculation on the axial force gradient dF with the vehicle speed V, the target turning corresponding angle $\theta p^*$, and the q-axis current iqt being used as input. Here, the map uses the vehicle speed V, target turning corresponding angle $\theta p^*$, and the q-axis current iqt as input variables and the axial force gradient dF as an output variable.

Action and Effect of Present Embodiment

The PU 52 sets the target reaction force torque Ts by subtracting the axial force F from the assist amount Ta. Then, the torque of the reaction force motor 22 is controlled according to the target reaction force torque Ts. The axial force F is a value that can be adjusted by control design. Therefore, the steering reaction force to be applied to the driver can be freely designed by control design. However, the stability of the steering system is more likely to deteriorated as the change in the axial force F with respect to the change in the steering angle $\theta s$ is greater. Therefore, the appropriate phase lag compensation by the phase lag compensation processing M60 and the appropriate phase advance compensation by the phase advance compensation processing M70 depend on the axial force gradient dF.

Therefore, the PU 52 changes the filter coefficients $\alpha$, T1, T2 and the gain Gad according to the axial force gradient dF. As a result, appropriate phase compensation can be implemented according to the magnitude of the axial force gradient dF.

Further, as an example, the PU 52 may change the filter coefficients $\alpha$, T1, T2 according to the axial force gradient dF under the condition that the phase lag amount when the magnitude of the axial force gradient dF is large is equal to or larger than the phase lag amount when the magnitude of the axial force gradient dF is small. Further, as an example, the PU 52 may change the gain Gad according to the axial force gradient dF under the condition that the phase advance amount when the magnitude of the axial force gradient dF is large is equal to or less than the phase advance amount when the magnitude of the axial force gradient dF is small.

Second Embodiment

A second embodiment will be described below with reference to the drawings while focusing on the differences from the first embodiment.

Figure 5:
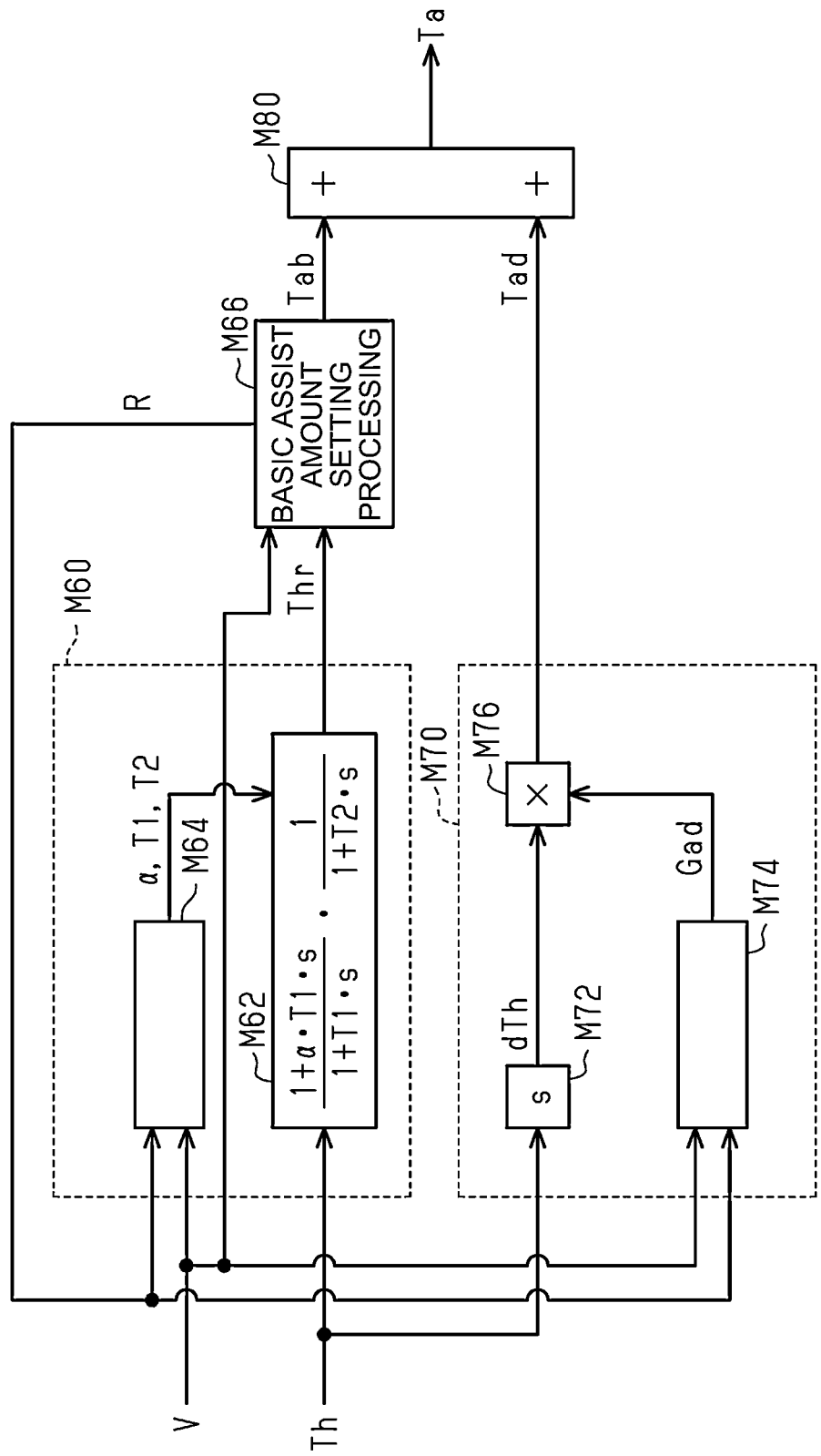
FIG. 5 is a block diagram showing processing to be executed by a control device according to a second embodiment.

FIG. 5 shows details of the assist amount setting processing M20. Note that in FIG. 5, the same step numbers are given to the processing corresponding to the processing shown in FIG. 4 for convenience. As shown in FIG. 5, in the present embodiment, the filter coefficient setting processing M64 of the phase lag compensation processing M60 does not use the axial force gradient dF as input. Further, the gain setting processing M74 of the phase advance compensation processing M70 also does not use the axial force gradient dF as input.

Figure 6:
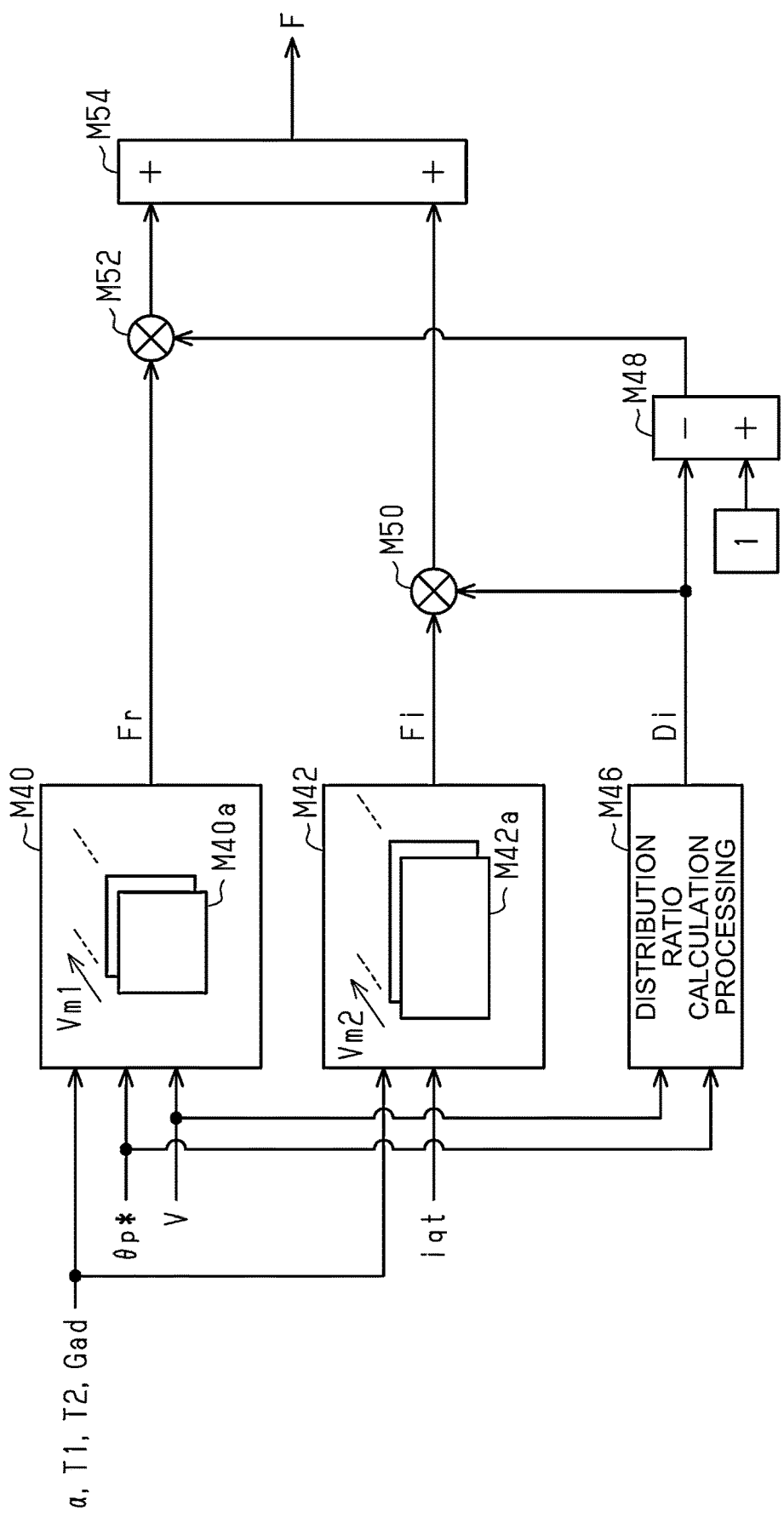
FIG. 6 is a block diagram showing processing to be executed by the control device according to the second embodiment.

FIG. 6 shows details of the axial force setting processing M22. Note that in FIG. 6, the same step numbers are given to the processing corresponding to the processing shown in FIG. 3 for convenience.

As shown in FIG. 6, the angular axial force setting processing M40 takes, as input, the filter coefficients $\alpha$, T1, T2 of the phase lag compensation processing M60 and the gain Gad of the phase advance compensation processing M70. Specifically, the angular axial force setting processing M40 includes processing of calculating the value of a map specifying variable Vm1 from the filter coefficients $\alpha$, T1, T2 and the gain Gad. On the other hand, in the present embodiment, there is a plurality of types of angular axial force maps M40a that use the target turning corresponding angle θp* and the vehicle speed V as input variables and use the angular axial force Fr as an output variable. The angular axial force setting processing M40 includes processing of determining, based on the map specifying variable Vm1, which of the plurality of types of angular axial force maps M40a is used to perform map calculation on the angular axial force Fr.

As a result, it is possible to change the ratio of the change in the angular axial force Fr to the change in the steering angle θs according to the filter coefficients α, T1, T2 and the gain Gad.

Further, the current axial force setting processing M42 takes, as input, the filter coefficients α, T1, T2 of the phase lag compensation processing M60 and the gain Gad of the phase advance compensation processing M70. Specifically, the current axial force setting processing M42 includes processing of calculating the value of the map specifying variable Vm2 from the filter coefficients α, T1, T2 and the gain Gad. Further, in the present embodiment, there is a plurality of types of current axial force maps M42a using the q-axis current iqt as input variable and the current axial force Fi as an output variable. The current axial force setting processing M42 includes processing of determining, based on the map specifying variable Vm2, which of the plurality of types of current axial force maps M42a is used to perform map calculation on the current axial force Fi.

As a result, it is possible to change the ratio of the change in the current axial force Fi to the change in the steering angle θs according to the filter coefficients α, T1, T2 and the gain Gad.

Corresponding Relation

The corresponding relation between the matters in the above embodiment and the matters described in the column of "SUMMARY" described above is as follows. In the following description, "(−1)·Ts" is an example of the steering reaction force. The assist amount setting processing M20, the axial force setting processing M22, and the subtraction processing M24 are examples of the reaction force setting processing. The reaction force operation signal generation processing M26 is an example of reaction force application processing. The axial force gradient calculation processing M90 is an example of the axial force gradient calculation processing. In FIG. 4, the input of the axial force gradient dF to the filter coefficient setting processing M64 and the gain setting processing M74 is an example of the interlocking processing. In FIG. 6, the input of the filter coefficients α, T1, T2 and the gain Gad to the angular axial force setting processing M40 and the current axial force setting processing M42 is an example of the interlocking processing. The phase lag compensation processing M60 and the phase advance compensation processing M70 are examples of the phase compensation processing. The assist amount setting processing M20 is an example of the assist amount setting processing. The axial force setting processing M22 is an example of the axial force setting processing. The filter coefficients α, T1, and T2 are examples of the lag regulation variables. The gain Gad is an example of the advance regulation variable. The filter coefficients α, T1, T2 and the gain Gad are examples of the phase regulation variable. The processing illustrated in FIG. 6 is an example of the interlocking processing.

OTHER EMBODIMENTS

Note that the present embodiment can be implemented with modifications as follows. The present embodiment and the following modified examples can be implemented in combination with each other within a technically consistent range.

Regarding Phase lag Compensation Processing

In FIG. 4, the filter coefficient setting processing M64 takes, as input, the vehicle speed V, the assist gradient R, and the axial force gradient dF, but the present disclosure is not limited to this example. For example, the input to the filter coefficient setting processing M64 may be the assist gradient R and the axial force gradient dF. Furthermore, for example, the input to the filter coefficient setting processing M64 may be the vehicle speed V and the axial force gradient dF.

In FIG. 5, the filter coefficient setting processing M64 takes, as input, the vehicle speed V and the assist gradient R, but the present disclosure is not limited to this example. For example, only one of the vehicle speed V and the assist gradient R may be input to the filter coefficient setting processing M64.

The phase lag filter included in the filter processing M62 is not limited to the above-mentioned filter in which the order of the Laplace operator of each of the denominator and the numerator are 1.

It is not essential that the filter processing M62 includes a phase lag filter and a low-pass filter. For example, it may include only a phase lag filter.

In the above-mentioned embodiment, the filter coefficients α, T1, T2 are set as targets to be changed by the filter coefficient setting processing M64, but the present disclosure is not limited to this example. For example, only two of the three filter coefficients α, T1, T2 may be set as targets to be changed. Furthermore, for example, only one of the three filter coefficients α, T1, T2 may be set as a target to be changed.

Regarding Phase Advance Compensation Processing

In FIG. 4, the gain setting processing M74 takes, as input, the vehicle speed V, the assist gradient R, and the axial force gradient dF, but the present disclosure is not limited to this example. For example, the input to the gain setting processing M74 may be the assist gradient R and the axial force gradient dF. Furthermore, for example, the input to the gain setting processing M74 may be the vehicle speed V and the axial force gradient dF.

In FIG. 5, the gain setting processing M74 takes, as input, the vehicle speed V and the assist gradient R, but the present disclosure is not limited to this example. For example, only any one of the vehicle speed V and the assist gradient R may be input to the gain setting processing M74.

A low-pass filter may be provided between the differential calculation M72 and the multiplication processing M76. In that case, the filter coefficient of the low-pass filter may be changed according to the axial force gradient dF.

Instead of multiplying the time differential value dTh by the gain Gad in the multiplication processing M76, map data that takes the time differential value dTh as input and the advance compensation amount Tad as output may be provided.

It is not essential that the phase advance compensation processing includes the processing of calculating the time differential value dTh. For example, instead of calculating the time differential value dTh, it may include processing of inputting the steering torque Th to the phase advance compensation filter.

Regarding Phase Compensation Processing

It is not essential that the phase compensation processing consists of the phase lag compensation processing M60 and the phase advance compensation processing M70. For example, only one of the two processing of the phase lag compensation processing M60 and the phase advance compensation processing M70 may be included. Further, for example, processing other than the two processing of the phase lag compensation processing M60 and the phase advance compensation processing M70 may be included.

Regarding Axial Force Setting Processing

It is not essential that the angular axial force setting process M40 is the processing of performing map calculation on the angular axial force Fr with the angular axial force map M40a. For example, the angular axial force setting processing M40 may be processing of substituting, into the angular axial force Fr, a value obtained by multiplying the target turning corresponding angle θp* by a gain. Here, the gain may be made variable according to the vehicle speed V.

It is not essential that the input to the angle axial force setting processing M40 includes the target turning corresponding angle θp* and the vehicle speed V. For example, the vehicle speed V may not be included in the input to the angular axial force setting processing M40. Further, for example, the angle variable of the steering system as input variable of the angular axial force setting processing M40 is not limited to the target turning corresponding angle θp*. For example, the angle variable of the steering system may be the turning corresponding angle θp. Further, for example, the angle variable of the steering system may be the steering angle θs.

The current axial force setting processing M42 is not limited to the processing of performing map calculation on the current axial force Fi with the current axial force map M42a. For example, the current axial force setting processing M42 may be processing of substituting, into the current axial force Fi, a value obtained by multiplying the q-axis current iqt by a gain.

The input to the current axial force setting processing M42 is not limited to the q-axis current iqt. For example, the input to the current axial force setting processing M42 may be the q-axis current iqt and the vehicle speed V. Further, for example, the input to the current axial force setting processing M42 may include angle variables of the steering system such as the target turning corresponding angle θp*, the turning corresponding angle θp, and the steering angle θs.

It is not essential that the input to the distribution ratio calculation processing M46 includes the target turning corresponding angle θp* and the vehicle speed V. For example, the vehicle speed V may not be included in the input to the distribution ratio calculation processing M46. Further, for example, the angle variable of the steering system as input variable of the distribution ratio calculation processing M46 is not limited to the target turning corresponding angle θp*. For example, the angle variable of the steering system may be the turning corresponding angle θp. Further, for example, the angle variable of the steering system may be the steering angle θs.

It is not essential that the axial force setting processing includes both the two processing of the angular axial force setting processing M40 and the current axial force setting processing M42. For example, with respect to the two processing of the angular axial force setting processing M40 and the current axial force setting processing M42, any one processing of them may be limitedly included.

Regarding Axial Force Gradient Calculation Processing

The input to the axial force gradient calculation processing M90 is not limited to the q-axis current iqt, the target turning corresponding angle θp*, and the vehicle speed V. For example, the turning corresponding angle θp may be used as the angle variable of the steering system. Further, for example, the steering angle θs may be used as the angle variable of the steering system.

The axial force gradient calculation processing is not limited to the processing of calculating the axial force gradient dF with the vehicle speed V, the angle variable of the steering system, and the q-axis current iqt being used as input. For example, the axial force gradient calculation processing may take the axial force F as input.

Regarding Interlocking Processing

In FIG. 4, all of the filter coefficients α, T1, T2 of the phase lag compensation processing M60 are changed with the axial force gradient dF being used as input, but the present disclosure is not limited to this example. For example, only two of the three filter coefficients α, T1, T2 may be changed with the axial force gradient dF being used as input. Further, for example, only one of the three filter coefficients α, T1, T2 may be changed with the axial force gradient dF being used as input.

In FIG. 6, the value of the map specifying variable Vm1 for specifying which of the plurality of types of angular axial force maps M40a is used is set according to the filter coefficients α, T1, T2 and the gain Gad, but the present disclosure is not limited to this example. For example, the value of the map specifying variable Vm1 may be set by inputting three of the four filter coefficients α, T1, T2 and gain Gad. Furthermore, for example, the value of the map specifying variable Vm1 may be set by inputting two of the four filter coefficients α, T1, T2 and gain Gad. Further, for example, the value of the map specifying variable Vm1 may be set by inputting one of the four filter coefficients α, T1, T2 and gain Gad.

In FIG. 6, the value of the map specifying variable Vm2 for specifying which of the plurality of types of current axial force maps M42a is used is set according to the filter coefficients α, T1, T2 and the gain Gad, but the present disclosure is not limited to this example. For example, the value of the map specifying variable Vm2 may be set by inputting three of the four filter coefficients α, T1, T2 and gain Gad. Further, for example, the value of the map specifying variable Vm2 may be set by inputting two of the four filter coefficients α, T1, T2 and gain Gad. Further, for example, the value of the map specifying variable Vm2 may be set by inputting one of the four filter coefficients α, T1, T2 and gain Gad.

In FIG. 6, the value of the map specifying variable Vm1 for specifying which of the plurality of types of angular axial force maps M40a is used is set according to the filter coefficients α, T1, T2 and the gain Gad, but the present disclosure is not limited to this example. For example, guard processing of limiting the magnitude of the change amount in the angular axial force Fr may be provided, and a guard value thereof may be changed according to the filter coefficients α, T1, T2 and the gain Gad.

In FIG. 6, the value of the map specifying variable Vm2 for specifying which of the plurality of types of current axial force maps M42a is used is set according to the filter coefficients α, T1, T2 and the gain Gad, but the present disclosure is not limited to this example. For example, the guard processing of limiting the magnitude of the change amount in the current axial force Fi may be provided, and the guard value thereof may be changed according to the filter coefficients α, T1, T2 and the gain Gad.

It is not essential that the axial force regulation variable consists of a variable related to the current axial force Fi and a variable related to the angular axial force Fr. For example, the guard processing of limiting the magnitude of the change amount in the axial force F may be provided, and the guard value thereof may be changed according to the filter coefficients α, T1, T2 and gain Gad. In this case, the guard value of the axial force Fis the axial force regulation variable.

Regarding Steering Control Device

The steering control device is not limited to one that executes software processing of example, it may include a dedicated hardware circuit such as an ASIC for executing at least a part of the processing to be executed in the above-described embodiments, for example. In other words, the steering control device may include a processing circuit having any of the following configurations (a) to (c): (a) a processing circuit including a processing device for executing all of the above-described processing according to a program, and a program storage device such as a storage device for storing the program; (b) a processing circuit including a processing device and a program storage device that execute a part of the above-described processing according to a program, and a dedicated hardware circuit for executing the remaining processing; and (c) a processing circuit including a dedicated hardware circuit for executing all of the above-described processing. Here, there may be a plurality of software execution devices each including the processing device and the program storage device. Further, there may be a plurality of dedicated hardware circuits.

Others

It is not essential that the turning motor 42 be a synchronous machine. For example, it may be an induction machine.

In each of the above embodiments, the steering device 10 has a linkless structure in which the steering wheel 12 and the turning wheels 34 are mechanically separated from each other at all times. However, the present disclosure is not limited to this example, and it may have a structure in which the steering wheel 12 and the turning wheels 34 can be mechanically separated from each other via a clutch.

What is claimed is:

1. A steering control device configured to control, as an object of control, a steering system including a reaction force motor that applies a steering reaction force to a steering shaft and a turning motor that turns a turning wheel in a state where power transmission from the steering shaft is cut off, the steering control device comprising a processor configured to execute reaction force setting processing, reaction force application processing, axial force gradient calculation processing, and interlocking processing, wherein the reaction force setting processing is processing of setting the steering reaction force using phase compensation processing, the reaction force application processing is processing of operating the reaction force motor with a reaction force set by the reaction force setting processing as input thereto, the phase compensation processing is processing of performing phase compensation on the steering reaction force, the axial force gradient calculation processing is processing of calculating an axial force gradient, the axial force gradient is a variable indicating a ratio of a change in resisting force against rotation of the steering shaft to a change in rotation angle of the steering shaft, the interlocking processing is processing of changing one of both a value of a phase compensation regulation variable and the axial force gradient according to the other, and the phase compensation regulation variable is a variable that regulates a manner of the phase compensation.

2. The steering control device according to claim 1, wherein the reaction force setting processing includes assist amount setting processing and axial force setting processing, the axial force setting processing is processing of setting an axial force that is a resisting force against a rotating operation of the steering shaft by a driver, the assist amount setting processing is processing that includes the phase compensation processing and sets an assist amount, the assist amount is an amount of assisting the driver to rotate the steering shaft, the steering reaction force is an amount determined according to a value obtained by subtracting the assist amount from the axial force, and the axial force gradient calculation processing is processing of calculating a change amount of the axial force set by the axial force setting processing with respect to the change in the rotation angle of the steering shaft.

3. The steering control device according to claim 1, wherein the interlocking processing is processing of changing a value of the phase compensation regulation variable with the axial force gradient as input.

4. The steering control device according to claim 2, wherein the assist amount setting processing is processing of setting the assist amount according to a detection value of steering torque input to the steering shaft, the phase compensation processing includes phase lag compensation processing, the phase lag compensation processing is processing of delaying a phase of the detection value and inputting the phase-delayed detection value to the assist amount setting processing, the phase compensation regulation variable includes a lag regulation variable, the lag regulation variable is a variable for regulating the phase lag compensation processing, and the interlocking processing includes processing of changing a value of the lag regulation variable with the axial force gradient as input.

5. The steering control device according to claim 2, wherein the assist amount setting processing includes basic assist amount setting processing, the basic assist amount setting processing is processing of setting a basic assist amount according to a detection value of steering torque input to the steering shaft, the phase compensation processing includes phase advance compensation processing, the phase advance compensation processing is processing of calculating an advance correction amount of the basic assist amount with the detection value as input, the assist amount setting processing is processing of setting the assist amount according to a value obtained by correcting the basic assist amount with the advance correction amount, the phase compensation regulation variable includes advance regulation variable, the advance regulation variable is a variable for regulating the phase advance compensation processing, and the interlocking processing includes processing of changing the value of the advance regulation variable with the axial force gradient as input.

6. The steering control device according to claim 2, wherein the axial force setting processing includes processing of setting the axial force according to a value of an axial force regulation variable, the axial force regulation variable is a variable for regulating a relationship of the axial force to a value of an angle variable of the steering system, and the interlocking processing includes processing of changing the value of the axial force regulation variable with the value of the phase compensation regulation variable as input.

* * * * *